United States Patent [19]

Miyazaki

[11] Patent Number: 4,887,488
[45] Date of Patent: Dec. 19, 1989

[54] POWER TRANSMISSION ASSEMBLY OF BELT-TYPE

[75] Inventor: Kunio Miyazaki, Fujimi, Japan

[73] Assignee: Honda Giken Kogyo Kabushiki Kaisha, Tokyo, Japan

[21] Appl. No.: 550,530

[22] Filed: Nov. 10, 1983

[30] Foreign Application Priority Data

Nov. 10, 1982 [JP] Japan .................. 57-197949

[51] Int. Cl.$^4$ ............................................ F16H 37/02
[52] U.S. Cl. ........................................ 74/689; 186/230
[58] Field of Search ............... 180/230; 74/689; 474/82

[56] References Cited

U.S. PATENT DOCUMENTS

| 2,077,628 | 4/1937 | Jordan | 180/230 X |
| 3,934,492 | 1/1976 | Timbs | 74/689 X |
| 4,169,512 | 10/1979 | Ishikawa et al. | |
| 4,344,500 | 8/1982 | Kurata et al. | 180/230 |
| 4,345,664 | 8/1982 | Anno et al. | 180/230 |
| 4,373,601 | 2/1983 | Onda et al. | 180/230 X |
| 4,462,482 | 7/1984 | Tsuboi | 180/230 |
| 4,463,823 | 8/1984 | Tsuboi | 180/230 X |
| 4,467,669 | 8/1984 | Kawamoto | 474/72 X |
| 4,467,670 | 8/1984 | Kawamoto | 474/72 X |

FOREIGN PATENT DOCUMENTS

| 1036083 | 7/1955 | Fed. Rep. of Germany . | |
| 129953 | 8/1982 | Japan | 74/689 |
| 809968 | 7/1957 | United Kingdom . | |

Primary Examiner—Dwight G. Diehl
Attorney, Agent, or Firm—Armstrong, Nikaido, Marmelstein, Kubovcik & Murray

[57] ABSTRACT

A power transmission system of the belt-type for a motorcycle including a driving pulley to be driven by a crankshaft of an engine and a driven pulley connected by a belt to the driving pulley. A gear change mechanism including a plurality of gears is interposed between the crankshaft and the driving pulley.

2 Claims, 3 Drawing Sheets

POWER TRANSMISSION ASSEMBLY OF BELT-TYPE

BACKGROUND OF THE INVENTION

This invention relates to improvements in power transmission systems of the belt type used for small sized, lightweight motorcycles and the like.

A small sized, lightweight motorcycle generally has a power transmission system of the belt type.

Such a power transmission system comprises a driving side variable diameter pully mounted on the output end of the crankshaft, a driven side variable diameter pulley mounted on a portion in proximity to the axle, and a V belt installed over said pulleys. In such a power transmission system, a gear change mechanism is provided on a portion in proximity to the axle, either on the upstream of the driven pulley to output power from the gear change mechanism to the axle or on the upstream of the driven pulley to take out power from the shaft of the driven pulley. In each case, the gear change mechanism having a multiplicity of gears and shafts is provided in the vicinity of the axle. However, in a small sized, lightweight motorcycle, a suspension mechanism of the power unit swing type where an engine, a crankcase and a transmission case are integrated is generally used in many cases. The transmission including said crankshaft is incorporated in the case and a gear change mechanism is provided about the rear wheel axle supported by the rear portion of the case.

In the foregoing conventional transmission mechanism, because a heavy gear change mechanism is mounted about the rear wheel axle, the proportion of the load on the rear cushion unit suspending the power unit becomes great. Because heavy objects are placed away from the swing pivot of the power unit, inertia about the pivot also becomes great.

Further, because the gear change mechanism is incorporated in the rear portion of the transmission case, it is located away from the crankcase from the viewpoint of lubrication, requiring separate means of lubrication, making piping, routing and other oil feeding structure complicated and requiring the transmission case to be made oiltight up to the rear portion. Manufacture of the transmission case becomes troublesome and complicated and requires sealing materials of high oiltight quality.

SUMMARY AND OBJECT OF THE INVENTION

This invention was produced to eliminate the foregoing disadvantages.

The object of this invention is to provide, in a power transmission system of the belt type for a motorcycle and the like, a power transmission system of the belt type having advantages of mounting concentratedly heavy objects in proximity to the swing pivot of a power unit. The proportion of the load on the rear cushion unit can be reduced. By mounting a gear change mechanism in proximity to a crankshaft, common use of lubricating oil can be achieved, lubrication structure can be simplified and sealing structure can also be simplified.

In order to accomplish the foregoing object, the present invention is characterized by connecting a gear change mechanism directly to a crankshaft and connecting a driving pulley mechanism to the output shaft of said gear change mechanism.

BRIEF DESCRIPTION OF THE DRAWINGS

The above and other objects and the attendant advantages of the present invention will become readily apparent by reference to the following detailed description when considering in conjunction with the accompanying drawings wherein.

DETAILED DESCRIPTION OF PREFERRED EMBODIMENTS

By referring to the attached drawings, a preferred embodiment of this invention is described below.

Figure 1:
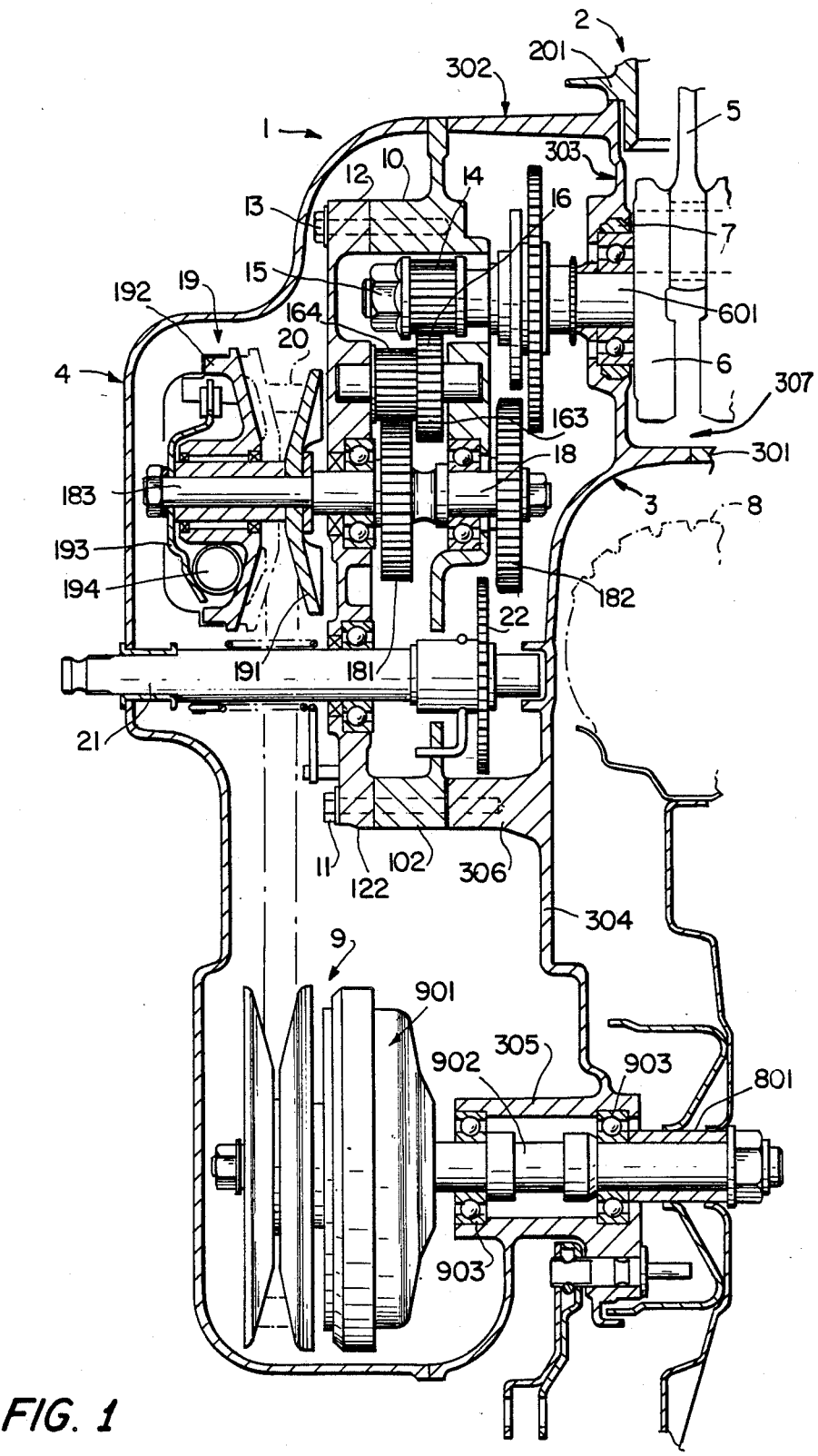
FIG. 1 is a cross-sectional plan view of the power transmission system.
Figure 2:
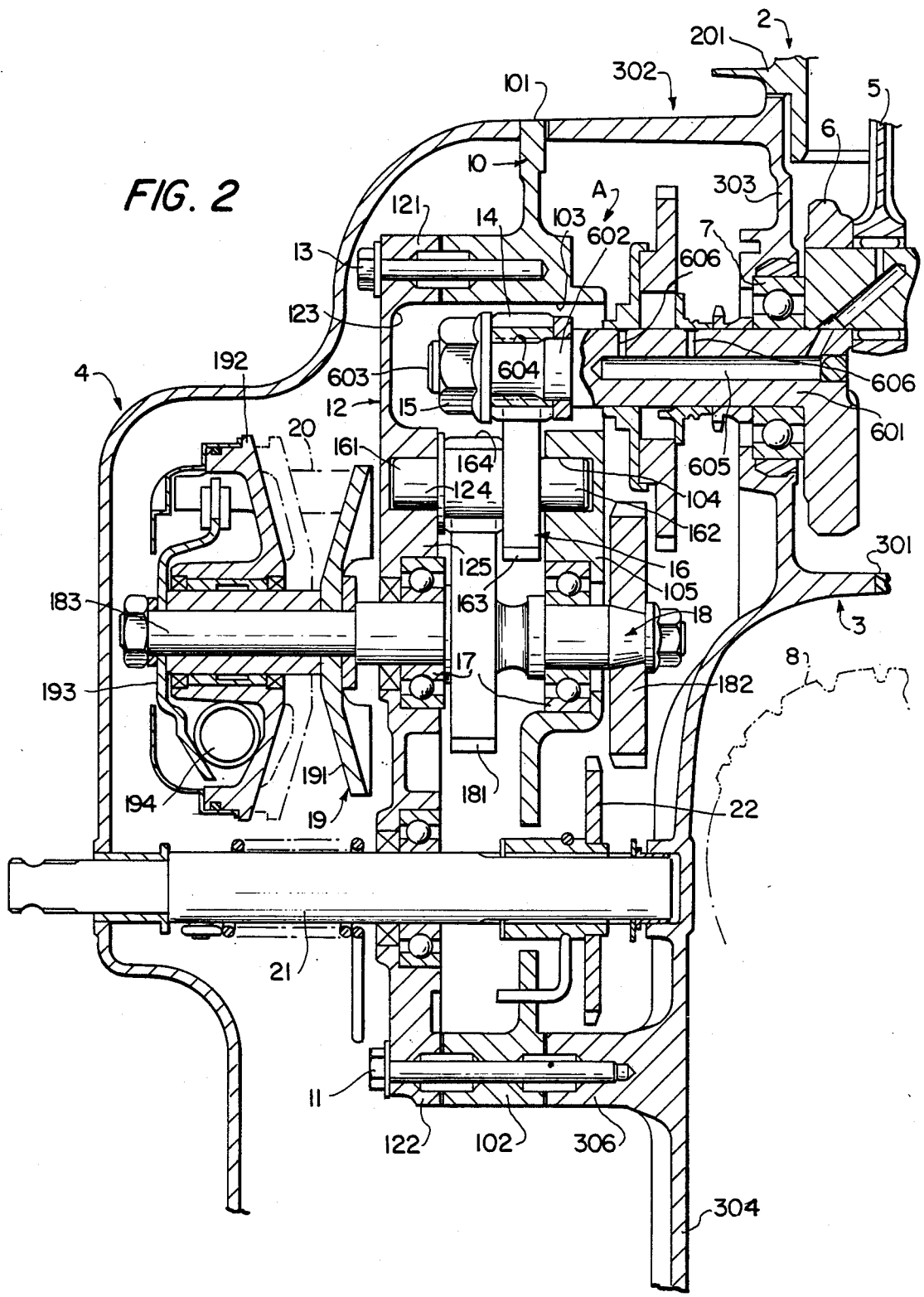
FIG. 2 is an enlarged view showing the major part thereof.

FIG. 1 is a cross-sectional plan view of a power unit 1, which comprises an engine 2 and a case 3 comprising a left and a right half joined to each other. The engine 2 is shown in the figure by a part of a cylinder block 201, which joins at its front with a crankcase half 301 of left-right split type. The crankcase half portion 301 is provided projectingly at the joint body front with a case 302 whose intermediate or rear portion constitutes a transmission case. The case 302 opens to outside or to left as viewed in the figure and is covered with a cover 4. A piston (not shown) is fitted into the cylinder block 201. The connecting rod 5 is connected to a crankshaft 6 laterally supported by the front of the case 3. The output shaft side journal section 601 of the crankshaft is rotatably supported through a bearing 7 by a bulkhead 303 provided inside the case 302 front. The other end of the crankshaft 6 is supported by another bulkhead on the other side of the engine. The described embodiment shown is of the power unit swing type with a rear cushion unit cantilever. Hence, the outside contour of the motorbike is shaped into a reverse L in plan view to support the rear wheel 8 constituting the driving wheel. A driven side pulley 9 is incorporated in the rear portion of the case 301. An axle 902 which is driven by said pulley 9 through a change-over mechanism 901 of the centrifugal clutch type which engages when the output revolutions of the engine is not less than specified and disengages when less than specified extends outside through a bearing 903 from a cylindrical bearing boss 305 provided at the rear of a case side wall 304 to drive the rear wheel 8. A hub 801 of the rear wheel 8 is fastened to said axle 902.

The case 302 is provided at the front or intermediate portion with a support wall 10. The front end 101 of the wall 10 is held between the front end edge of the case 302 and the front end of the cover 4. The rear end boss 102 of the wall 10 is fastened through a bolt 11 to a boss 306 inwardly provided at the intermediate portion of the case side wall 304. An intermediate wall 12 is placed outside the support wall 10. A front end boss 121 of the intermediate wall 12 is fastened through a bolt 13 to a boss provided on the outside surface of the front end of the support wall 101. A rear end boss 122 of the intermediate wall 12 is fastened to the boss 306 commonly with the rear end boss 102 of the support wall 10 through said bolt 11.

The support wall 10 is provided at the front with a bore 103 in the crankshaft axial direction and the intermediate wall 12 is provided at the front with a cavity 123 concentrically with said bore 103 into which the extension 602 of the crankshaft 6 is loosely fitted. A small diameter driving gear 14 is fastened to the extension 602. In the described embodiment, the extension 602 is provided at the end with a threaded portion 603 onto which a nut 15 is screwed to fix the gear 14. The gear 14 and extension 602 are joined to each other with a spline 604.

The support wall 10 is provided at the front intermediate portion with a bearing portion 104 recessed inwardly and the intermediate wall 12 is provided at the corresponding portion with a bearing portion 124 recessed outwardly. An intermediate gear 16 is fitted and supported by its shafts 161, 162 on both ends between said two bearing portions 104, 124. The intermediate gear 16 is provided inside with a large diameter first intermediate gear 163 and outside with a small diameter second intermediate gear 164. The gears 162, 164 are provided as one piece or integrally on the same shaft. The large diameter first intermediate gear 163 meshes with the driving gear 14 of the crankshaft extension to transmit output of the crankshaft.

Between the intermediate portions of the support wall 10 and the intermediate wall 12, a driven shaft 18 is supported through bearings 17, 17 by bearing portions 105, 125, both ends of the driven shaft 18 extending outwardly of the walls 10, 12 respectively. A driven gear 181 is provided at the intermediate portion between the bearings 17, 17 meshing with the second intermediate gear 164 of the intermediate gear 16 adjacent thereto. By this arrangement, output of the crankshaft 6 is transmitted to the driven shaft 18 through a train of gears 14, 163, 164, 181. The driven shaft 18 is provided at the extension outwardly of the support wall 10 with a starting driven gear 182 and at the extension 183 outwardly of the intermediate wall 12 with a variable diameter pulley system 19.

The pulley system 19 in this embodiment comprises a fixed face 191 mounted on the extension 183 on the inner side and a movable face 192 which is mounted on the extension 183 on the outer side and is movable in the axial direction. The movable face 192 is to open or close clearance with the fixed face 191 by radial movement by virtue of centrifugal action of a weight roller 194 placed between the back thereof and a ramp plate 193, thereby expanding or reducing a belt 20 in diameter installed over it and the driven pulley 9 to perform gear changing.

A kick starter spindle 21 has a starter gear 22 mounted thereon through a quick thread mechanism, for instance, which starter gear 22 meshes with the gear 182 at starting operation to perform starting.

Now, the case 3 forms a crankcase 307 with a crankcase right half 301 and the front portion of the case 302, the right half of the crankcase 307 being divided by the bulkhead 303 from the case 302. An ACG and other equipment (not shown) are provided on the right end (not shown) of the crankshaft. The crankshaft 6 is lubricated by forced lubrication, for instance, oil is fed through passages 605, 606 ... and others provided on the crankshaft 6, and a gear change mechanism A is provided on the extension 602 of the crankshaft, so that lubricating oil for the crankshaft can be utilized for lubricating the gear change mechanism adjacent thereto.

Figure 3:
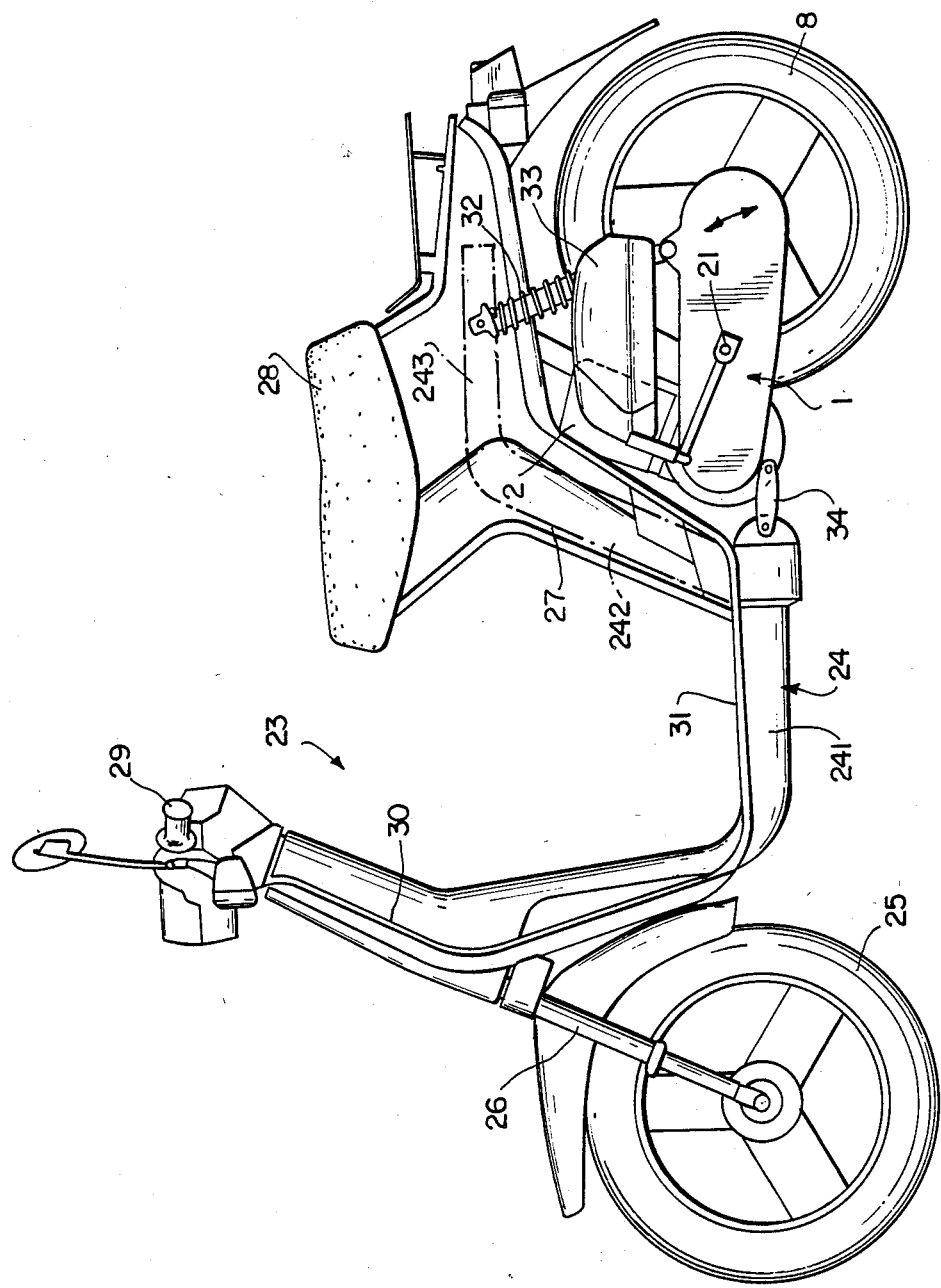
FIG. 3 is a side view showing an embodiment of the motorcycle in accordance with this invention.

FIG. 3 shows an embodiment of the motorcycle on which the foregoing power unit 1 is provided. The embodiment shows a motorcycle 23 of the low floor scooter type, which as is well known supports steerably a front fork 26 supporting a front wheel 25 by a head tube (not shown) at the front end of a frame 24. The frame 24 includes a lower horizontal part 241, a generally vertical part 242, and an upper horizontal part 243. The frame 24 is provided at the rear with a seat 28 through a seat post covered with a seat post cover 27 and at the front with a handle 29 connected to the front fork. The front cover 30 serves also as a leg shield thereunder and a footrest floor 31 is provided at a low level between the seat and front cover. The power unit 1 is pivotally mounted by its front portion on the lower part 241 of the frame 24 so that it swingably extends rearwardly of said lower pat 241, the rear portion of the power unit 1 supporting the rear wheel 8. A rear cushion unit 32 of the cantilever type is place between the rear portion of the power unit case 302 and the upper horizontal part 243 of the frame 24. An air cleaner case 33 is provided above the case 302. A link 34 pivotally connects the power unit 1 to the lower horizontal part 241 of the frame 24.

Because the heavy objects, such as the engine 2 and crankshaft 6, are placed at the front of the power unit 1, the gear change mechanism A is provided adjacent to the crankshaft 6 so as to be connected thereto, and the driving pulley 19 is connected to the gear change mechanism A for transmitting output, the weighty gear change mechanism A concentrates on the front portion where heavy objects are present. In this manner, heavy objects are concentrated in the neighborhood of the swing pivot near the link 34 of the power unit 1. Therefore, differing from conventional motorcycles where the gear change mechanism is placed on the rear portion of the power unit, it is possible to reduce the proportion of load on the rear cushion unit of the rear suspension system.

Furthermore, because the gear change mechanism is incorporated in that portion adjacent to the power unit crankcase, only the front portion of the case having the crankcase becomes a little wider, which is not conspicuous since the front portion of the power unit has hitherto been wide, whereas the rear portion of the case can be made smaller in width as it lacks a gear change mechanism, which is good from the viewpoint of appearance.

Furthermore, because the gear change mechanism is provided adjacent to the crankshaft so as to be connected thereto, lubricating oil for the crankshaft can be utilized commonly for the gear change mechanism. Therefore, the lubricating system for the gear change mechanism can be simplified. Because the lubricating system concentrates on the front portion, it is sufficient to seal only this portion and around, which contributes to simplification of the sealing structure.

This invention has many advantages as described above.

It is readily apparent that the above-described power transmission of the belt-type meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A power transmission system of the belt-type for a motorcycle having in inverted L-shaped frame; an integrated power unit including an engine having a crankshaft, a crankcase and a transmission; a rear wheel on an axle supported in the rear of the transmission; and a swing power unit support means including a pivot link pivotally interconnecting the engine to a lower portion of the frame and a rear cushion unit including at least one shock absorber bridging an upper portion of the frame and a rear portion of the transmission; the transmission including a driving pulley associated with the engine; a driven pulley associated with the axle and coaxial therewith for driving the axle, and a belt running between the driving pulley and the driven pulley; the power transmission system being characterized in that a gear reduction mechanism comprising a plurality of gears mounted in the transmission is interposed between said crankshaft of said engine and said driving pulley, and a drive shaft which drives said driving pulley is parallel with said crankshaft and offset in the radial direction therefrom.

2. The power transmission system according to claim 1, further characterized in that a starter gear is mounted to be axially movable, such that in a starting position, said starter gear meshes with a gear mounted on said drive shaft of said driving pulley.

* * * * *